US006224657B1

(12) United States Patent
Myers et al.

(10) Patent No.: US 6,224,657 B1
(45) Date of Patent: *May 1, 2001

(54) HEXAVALENT CHROMIUM-FREE PHOSPHATE-BONDED COATINGS

(75) Inventors: Ronald E. Myers, Pottstown; Mark F. Mosser, Perkiomenville; Kevin B. Eddinger, Gilbertsville; John E. Hughes, West Chester, all of PA (US)

(73) Assignee: Sermatech International, Inc., Limerick, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/170,340

(22) Filed: Oct. 13, 1998

(51) Int. Cl.$^7$ ................. C09D 5/08; C23F 11/00
(52) U.S. Cl. ........... 106/14.12; 148/258; 148/261; 148/262; 427/376.6; 427/402; 427/405
(58) Field of Search .......... 106/14.12; 148/258, 148/261, 262; 427/376.6, 402, 405; 428/457

(56) References Cited

U.S. PATENT DOCUMENTS

| | | | |
|---|---|---|---|
| 3,248,251 | 4/1966 | Allen | 106/286.2 |
| 3,395,027 | 7/1968 | Klotz | 106/1.12 |
| 3,932,198 | 1/1976 | Schneider | 148/265 |
| 4,263,059 | 4/1981 | Guhde et al. | 148/266 |
| 4,761,189 | 8/1988 | Mady et al. | 148/6.16 |
| 5,242,488 | 9/1993 | Stetson et al. | 106/14.12 |
| 5,279,649 | 1/1994 | Stetson et al. | 106/14.12 |
| 5,279,650 | 1/1994 | Stetson et al. | 106/14.12 |
| 5,304,257 | 4/1994 | Pearlstein et al. | 148/265 |
| 5,399,209 | 3/1995 | Suda et al. | 148/258 |
| 5,415,702 | 5/1995 | Bishop et al. | 148/258 |
| 5,478,413 | 12/1995 | Mosser et al. | 148/261 |
| 5,968,240 | * 10/1999 | Myers et al. | 106/14.12 |

FOREIGN PATENT DOCUMENTS 41 35 524 4/1993 (DE).

OTHER PUBLICATIONS

Mosser, Mark F., "Metallic—Ceramic Coatings as Replacements for Cadmium Plating", SAE Technical Paper, No. 900963 (Apr. 1990).

Mosser, Mark F. and Eddinger, Kevin B., "Environmentally Complaint Coatings for Turbine Compressor Applications", AESF 31st Annual Aerospace/Airline Plating and Metal Finishing Forum Proceedings (Apr. 1995).

\* cited by examiner

Primary Examiner—Anthony Green
(74) Attorney, Agent, or Firm—Seidel, Gonda, Lavorgna and Monaco, PC (57) ABSTRACT

A heat curable bonding composition of the present invention comprises an aqueous solution containing phosphate ion ($PO_4^{-3}$) and chromium(III) ion ($Cr^{+3}$, or trivalent chromium) and is substantially free of hexavalent chromium ions. The bonding composition may further contain at least one secondary cationic species. The bonding composition has a pH in the range of about 1 to about 3.5.

30 Claims, 1 Drawing Sheet

FIG. 1

HEXAVALENT CHROMIUM-FREE PHOSPHATE-BONDED COATINGS

FIELD OF THE INVENTION

The present invention relates generally to the field of corrosion protection for metal substrates, and more specifically, to bonding compositions and coating compositions free, or substantially free, of hexavalent chromium.

BACKGROUND OF THE INVENTION

Compositions comprising phosphoric acid and various insoluble pigments (e.g., aluminum metal) are well known for use in protecting metallic surfaces such as ferrous alloy surfaces from corrosion. In such coating compositions, particulate metallic aluminum such as flake and/or powdered aluminum is combined with a phosphoric acid bonding solution to form a coating composition which is then applied to the metallic surface being treated. After application to the surface, the coating composition may be heated to a first temperature, generally at least about 500° F. (260° C.), until the coating is rendered essentially water insoluble. The coated surface may then be cured at a second temperature, generally above 1000° F. (538° C.) to form the final protective coating.

The cured coating prepared from the combination of particulate metallic aluminum and phosphoric acid bonding solution is termed an "undercoat" or "basecoat". It is often further desirable to provide an extra protective barrier to the metal surface that may provide thermal resistance or simply augment the corrosion protection afforded by the coating formed from the coating composition described above. An extra protective layer applied to the cured undercoat is termed a "topcoat". The topcoat may be formed from a bonding solution similar to that used in the undercoat, but containing little or no particulate metal.

The basecoat or topcoat composition may further contain a pigment which imparts visually aesthetic qualities to the coating. The pigment(s) may also be functional and improve certain properties of the coating such as corrosion resistance and bond strength.

Care must be taken in the preparation of phosphate-based coating compositions containing particulate aluminum metal. The phosphoric acid bonding solution can react with the aluminum. Such reactions are considerably exothermic and can be very violent, causing the metallic aluminum to burn or even explode. These reactions may also result in the conversion of the metallic aluminum into various salts which interfere with the formation of suitable protective coatings. Thus, the reactive stability of a coating composition in the presence of metallic aluminum is of foremost concern if the coating composition is used as a basecoat. If the bonding composition is used as a topcoat, reactive stability in the presence of particulate aluminum metal is not a major concern.

U.S. Pat. No. 3,248,251, to Allen, describes coating compositions consisting essentially of a slurry of solid inorganic particulate material (such as metallic aluminum) in an aqueous acidic bonding solution containing dissolved metal chromate, dichromate or molybdate, and phosphate. Allen discloses that the addition of chromates or molybdates to the acidic bonding solution effectively passivates the solution toward aluminum and inhibits the oxidation of metallic aluminum, allowing particulate aluminum to combine with the bonding solution without the undesirable chemical reaction between the acidic bonding solution and the aluminum. These "Allen" coatings have been, and still are, used to provide high-quality coatings which protect ferrous metal alloy surfaces from oxidation and corrosion, particularly at high temperatures.

As understood herein, "chromate" refers equally to chromate ion, dichromate ion, and hexavalent chromium. Chromate ion also passivates the steel substrate to eliminate undesirable reactions such as acidic attack or pitting on the substrate. It is also known that the inclusion of chromate ion in the coating composition provides a coating having improved corrosion resistance.

However, while chromates have been used successfully to reduce the reactivity of the aluminum in coating compositions and to improve the corrosion resistance of the coatings, the use of chromates has become a problem because of environmental considerations. Chromates are considered to be toxic substances. Hexavalent chromium is a carcinogen. It is therefore desirable to avoid the use of solutions of their salts, or at least to reduce their use. For this reason, it has been desirable to develop a phosphate/aluminum corrosion resistant coating composition which requires little or no chromate or molybdate. Such coating compositions should protect ferrous metal alloy surfaces from oxidation and corrosive environmental conditions, especially at high temperatures, approximately as well as and preferably better than the so-called Allen coatings (i.e., per U.S. Pat. No. 3,248,251).

Efforts have been made to exclude chromate and molybdate from coating compositions while maintaining stable formulations. U.S. Pat. No. 5,242,488 to Stetson et al., describes a basecoat coating composition for ferrous alloys which does not require either chromates or molybdates to control the reaction between the bonding solution and the powdered aluminum. The composition consists essentially of a slurry mixture of a bonding solution and aluminum powder. The bonding solution consists essentially of water, phosphoric acid ($H_3PO_4$), and aluminum ions. The bonding solution must contain aluminum ions in solution such that the amount of aluminum in solution is substantially at the saturation point, thus leaving the bonding solution essentially inert with respect to any subsequent additions of aluminum.

U.S. Pat. No. 5,279,649, also to Stetson, et al., discloses substantially the same compositions, but to which $V_2O_5$ has been added as a source of vanadate ion, adding another inhibitor to the aluminum equilibrated mixture. Addition of $V_2O_5$ is an example of the addition of a toxic substance, listed on the EPA SARA Extremely Hazardous Substance List and also subject to Clean Air Act and CERCLA regulation.

Further, in U.S. Pat. No. 5,279,650, also to Stetson, et al., a seal coating (topcoat) composition containing vanadate ion and iron oxide ($Fe_2O_3$) powder is disclosed.

All three of these Stetson coating compositions are designed to avoid the use of chromate and molybdate ions and require the bonding solution to be equilibrated with respect to further additions of aluminum as described in these patents.

Although the Stetson patents indicate that these formulations control the reactivity between the bonding solution and the aluminum, some reaction still occurs between the bonding solution and the powdered aluminum when the slurry compositions of the Stetson patents are formulated.

U.S. Pat. No. 5,478,413 to Mosser et al. is directed to coating compositions lacking chromate or molybdate. These coating compositions are pigmented with metallic aluminum powder and can be applied to all ferrous alloys. These coatings may require a topcoat to be applied thereon for satisfactory protection of the metal substrate in some applications.

It is therefore desired to formulate a chromate- and molybdate-free bonding composition, or one which is of reduced chromate and molybdate content, which not only has a reduced reactivity with particulate aluminum when the two are combined to form a coating composition, but also enables the formulation of an effective coating while being free of toxic additives such as hexavalent chromium.

SUMMARY OF THE INVENTION

Bonding compositions are provided that enable the formation of effective corrosion-resistant coatings free of hexavalent chromium, that have a reduced reactivity with particulate aluminum, and promote the formation of well-sealed, protective barrier coatings.

A heat curable bonding composition is provided for a heat curable coating for coating a substrate, the bonding composition comprising phosphate ions, chromium(III) ions, and water. The bonding composition has a pH in the range from about 1.0 to about 3.5 and is substantially free of hexavalent chromium ions. The bonding composition of the invention preferably has a molar ratio of phosphate ions to chromium (III) ions in the range from about 0.7 to about 20, and may further comprise at least one secondary cationic species.

A heat curable topcoat composition is provided comprising phosphate ions, chromium(III) ions, and water. The topcoat composition has a pH in the range from about 1.0 to about 3.5 and is substantially free of hexavalent chromium ions and also comprises at least one additive selected from the group consisting of wetting agents, film-forming agents, corrosion inhibitors, dry lubricants, chromatic pigments, and combinations thereof. The topcoat composition of the invention preferably has a molar ratio of phosphate ions to chromium(III) ions in the range from about 0.7 to about 20, and may further comprise at least one secondary cationic species.

A heat curable coating composition is also provided comprising metallic aluminum particles dispersed in a bonding composition comprising phosphate ions, chromium(III) ions, and water. The composition has a pH in the range from about 1.0 to about 3.5 and is substantially free of hexavalent chromium ions. The coating composition preferably has a molar ratio of phosphate ions to chromium(III) ions in the range from about 0.7 to about 20, and may further comprise at least one secondary cationic species.

A coated article is also provided comprising a solid substrate having deposited thereon at least one layer of a coating formed by the steps of (a) applying to the substrate a heat curable coating composition comprising phosphate ions, chromium(III) ions, and water; the coating composition has a pH in the range from about 1.0 to about 3.5 and is substantially free of hexavalent chromium ions and (b) heat curing the applied coating composition to produce the coating. The coating composition may further comprise at least one secondary cationic species.

A coated article is further provided comprising a solid substrate having deposited thereon at least one layer of a coating formed by the steps of (a) applying to the substrate a heat curable coating composition comprising metallic aluminum particles dispersed in a heat curable bonding composition comprising phosphate ions, chromium(III) ions, and water; the coating composition has a pH in the range from about 1.0 to about 3.5 and is substantially free of hexavalent chromium ions and (b) heat curing the applied coating composition to produce the coating. The coating composition may further comprise at least one secondary cationic species.

A method of forming a coating composition on a solid substrate is provided comprising the steps of (a) applying to the substrate a heat curable coating composition comprising phosphate ions, chromium(III) ions, and water; the coating composition has a pH in the range from about 1.0 to about 3.5 and is substantially free of hexavalent chromium ions and (b) heat curing the applied coating composition to produce the coating. The coating composition may further comprise at least one secondary cationic species.

A method of forming a coating composition on a solid substrate is also provided comprising the steps of (a) applying to the substrate a heat curable coating composition comprising metallic aluminum particles dispersed in a heat curable bonding composition comprising phosphate ions, chromium(III) ions, and water; the coating composition has a pH in the range from about 1.0 to about 3.5 and is substantially free of hexavalent chromium ions and (b) heat curing the applied coating composition to produce the coating. The coating composition may further comprise at least one secondary cationic species.

DETAILED DESCRIPTION OF THE INVENTION

A heat curable bonding composition of the present invention comprises an aqueous solution containing phosphate ion ($PO_4^{-3}$) and chromium(III) ion ($Cr^{+3}$, or trivalent chromium). The bonding composition may be conveniently referred to as a phosphate/chromium(III) system. The bonding composition may further contain in solution at least one secondary cationic species.

"Secondary cationic species" is defined to be any cationic species introduced to the bonding composition that exists in addition to any cationic species already in the composition by virtue of the dissociation of compounds delivering phosphate ions or chromium(III) ions. Secondary cationic species generally function to modify the pH of the composition and are effective in producing viable cured coatings. The secondary cationic species of the invention are preferably metal cations having a valence greater than +1, though cations (metallic or non-metallic) having a valence of +1 are also acceptable, such as lithium ion or ammonium ion.

Metal ions that may be employed as secondary cationic species include aluminum ions, magnesium ions, iron ions, cerium ions, cobalt ions, nickel ions, manganese ions, copper ions, and zinc ions. Other cation species may be employed, limited only by the ability of the resulting bonding composition to be processed into an effective protective barrier and corrosion resistant coating in addition to being generally unreactive with respect to metallic aluminum or other added pigments. A preferred formulation of the invention contains aluminum ions, magnesium ions or zinc ions. Cobalt ions and nickel ions, though toxic to some extent, are far less toxic than chromate and molybdate ions and therefore can be used in the composition, particularly in the prescribed concentrations. The bonding composition of the present invention may contain a pigment or surface active agent for basecoat or modified topcoat applications.

The bonding composition of the present invention, and the coatings of the invention formulated therefrom, are substantially free of regulated toxic hexavalent chromium. "Substantially free", as used herein, is understood to mean completely free of said constituent, or inclusive of trace amounts of same. "Trace amounts" are those quantitative levels of a chemical constituent that are barely detectable and provide no benefit to the functional or aesthetic properties of the subject composition. As used herein, the term "chromate" refers to chromate ion, dichromate ion, and any other form of hexavalent chromium. Molybdate ions may be added in small amounts, subject to regulatory limitations, because toxicity of the molybdate is lower than chromate and it is not carcinogenic, per current understanding.

A coating composition may be formulated in accordance with the present invention by dispersing particulate metallic aluminum in the bonding composition, thus forming a basecoat composition. The bonding composition of the present invention may also be utilized in formulating a topcoat protective coating (or "sealer"). A bonding composition of the present invention can be applied to a surface and cured to form an overlay topcoat coating, or the bonding composition may have added thereto modifying additives for enhanced performance in topcoat coating applications. When a bonding composition is utilized to prepare a topcoat, the composition may be applied in any fashion that an overlay coating composition is applied and it may be applied directly to a basecoat on a substrate or directly to a substrate. It is understood that application of a topcoat composition to a solid substrate includes the case where a basecoat is first formed on the substrate.

The bonding composition of the invention has a pH in the range of about 1.0 to about 3.5, more preferably in the range of about 1.3 to about 3.0, and most preferably in the range of about 1.5 to about 2.5. To obtain the desired pH, additional amounts of acid or base may be added to the composition. To lower the pH by the addition of acid, a water-soluble phosphoric acid or acid salt such as magnesium dihydrogen phosphate may be used. While magnesium ions, aluminum ions, and zinc ions are most useful for pH control, such as their use for increasing the pH of the bonding composition, other cationic species can be used for similar purposes. These cations are usually introduced to the solution as metal oxides, metal-containing hydrated oxides, metal borates, metal carbonates or metal phosphates. Such compounds introduce not only secondary cationic species, but also may interact with the acidic phosphate solution to further modify the pH of the bonding composition.

If aluminum ions are present in the bonding composition, they are present in an amount below the saturation point, thus in a quantity insufficient to substantially equilibrate the bonding solution with respect to metal particles like aluminum which are added in formulating a coating composition. The concentration of aluminum ions dissolved in the bonding solution of the present invention is an amount less than that which permits the formation of an aluminum-containing precipitate or aluminum-containing salts. The existence of otherwise unreacted or precipitated aluminum or aluminum-containing salts indicates that the reaction between the aluminum ions in the solution with the phosphoric acid has gone to completion and equilibrium thus reached. As noted above, however, when aluminum ions are present in a bonding composition of the present invention, it is in an amount insufficient to neutralize the bonding composition with respect to aluminum particles.

The bonding composition of the invention is also referred to as a bonding solution. It is understood, however, that one or more individual components of the bonding solution may have low or reduced solubility or miscibility in water or aqueous phosphoric acid. Thus, in accordance with the invention, the term "aqueous bonding solution" or "bonding solution" is intended to include a composition which is a true solution, or in which one or more of its components may not be fully dissolved, but may be emulsified or dispersed in any other form.

A preferred source of trivalent chromium ions, $Cr^{+3}$, in a bonding composition of the invention is Cr(III) salt that is soluble in aqueous phosphoric acid. Such salt either reacts with the acid creating no anion or dissolves in the acid to produce the anion contained in or derived from the added trivalent chromium salt. Examples of suitable chromium salts include chromium phosphate, chromium hydroxide, chromium carbonate, or chromium borate.

Chromium(III) ions in bonding compositions of the invention may also be generated by virtue of the reduction of chromium(VI) species. Chromic acid, for example, generates Cr(VI) ions in the phosphoric acid solution which may be quickly reduced by reaction with hydrogen peroxide solution. Alternatively, addition of phosphorous acid ($H_3PO_3$) or hypophosphorous acid ($H_3PO_2$) will facilitate the same reaction. If hydrogen peroxide is used to reduce Cr(VI) ions, typically a 10–50 wt % aqueous solution is added to the bonding composition.

As noted, at least one secondary cationic species may be a constituent in a bonding composition of the invention. In such case, aluminum ions, magnesium ions and zinc ions are preferred metal cations in the bonding composition of the invention. Aluminum ions may be preferably introduced as aluminum hydroxide or as aluminum metal. A source of aluminum ions must be able to dissolve in the bonding composition, provide a stable bonding composition, and permit the formation of a viable coating as would be understood by one skilled in the art.

Acceptable sources of magnesium ions include magnesium carbonate, magnesium oxide, or magnesium hydroxide. Magnesium may be introduced as magnesium metal. Any source of magnesium ion is appropriate so long as it will dissolve in the aqueous phosphoric acid solution, provide a stable bonding composition, and permit the formation of a viable coating as would be understood by one skilled in the art.

Zinc ions may be supplied to the bonding composition in the form of an oxide, hydroxide, borate, carbonate, phosphate, or molybdate/phosphate of zinc. Acceptable sources of zinc ions include any compound that will dissolve in the aqueous phosphoric acid solution, provide a stable bonding composition, and permit the formation of a viable coating as would be understood by one skilled in the art. The amount of inorganic cation source, added alone or in combination with other compounds, should be sufficient to bring the pH within the desired range of about 1 to about 3.5.

The bonding composition of the present invention is stable, that is, unreactive or substantially unreactive, or even inert, to particulate metallic aluminum subsequently added to form a coating composition. A coating composition of the present invention will not exhibit visible signs of reaction when particulate aluminum is dispersed in the bonding solution for at least up to one hour, preferably for up to four hours, more preferably up to eight hours and ideally for more than eight hours.

The bonding compositions (and coating compositions prepared therefrom) of the present invention preferably have a molar ratio of phosphate ions to chromium(III) ions in the range from about 0.7 to about 20, most preferably in the range from about 1 to about 10.

The bonding compositions of the present invention have an upper limit of about 45 wt % nonvolatile content. The nonvolatile content of the solution is the quantity of inorganic material that remains in a bonding solution heated to 220° F. (105° C.) for 60 minutes as described in ASTM D2369. At levels greater than 45 wt %, it is difficult to dissolve enough pH-adjusting material. Additionally, higher nonvolatile component levels promote higher slurry viscosities upon addition of metallic aluminum particles or other pigments and additives, in turn negatively affecting the sprayability of the coating composition. Conversely, nonvolatile content levels that are too low do not permit formation of a useful coating. Most notably, coatings prepared from a bonding composition deficient in nonvolatile content are likely to exhibit impaired flexibility evidenced by failed bend adhesion tests. Therefore, bonding compositions of the present invention preferably have a nonvolatile content of from about 15 wt % to about 35 wt %.

In accordance with the present invention, the bonding compositions described herein may be effectively used to produce two distinct types of coatings: basecoats and topcoats.

A basecoat is a coating first applied directly onto a substrate, for the purpose of protecting it from environmental attack and/or enhancing a performance property which would otherwise not be an inherent characteristic of the uncoated substrate material. A basecoat may contain one or more pigments selected from a variety of pigments. A pigment may be either chemically inert or may have chemical or physical properties which render it an "active" pigment. A basecoat may contain both inert and active pigments.

An example of an inert pigment is an insoluble material added for aesthetic or decorative purposes, such as a colorant. Active pigments generally provide specific performance-enhancing functions to the coating. Active pigments, for example, may be employed to enhance leachable corrosion resistance, sacrificial corrosion resistance (via pigments of galvanically active metals, or thermo-oxidative resistance (through the use of refractory compounds such as silicon carbide). A single pigment may enhance more than one type of coating performance characteristic.

Bonding solutions of the invention may also be used to prepare topcoats. A topcoat is typically applied directly onto a cured basecoat, functioning primarily as an additional sealant or protective barrier for the basecoat. A topcoat may also contain pigments typically used for aesthetic purposes, but may also contain pigments which enhance performance properties such as abrasion resistance, fouling resistance, and the like.

In accordance with the present invention, a coating composition, particularly used as a basecoat composition, is formed by mixing the above-described bonding composition with particulate metal to form a slurry. Preferably, aluminum in the form of a powder is the particulate metal. The bonding composition is essentially inert with respect to any further reaction with the added aluminum and does not react therewith.

The bonding compositions of the present invention are particularly useful for forming coating compositions for ferrous metal alloy substrates when combined with particulate aluminum. The particulate metallic aluminum may be pure aluminum or alloys of aluminum; as understood herein, metallic aluminum is inclusive of pure aluminum and alloys of aluminum. Sources of particulate aluminum suitable for use in such coating compositions are well known, and have been discussed at length in the patent literature. For example, U.S. Pat. No. 4,863,516 to Mosser is particularly directed to the use of non-leafing aluminum flake in combination with atomized aluminum particles.

Metallic aluminum particles used in the preparation of the coating compositions of the invention may take the form of inert gas-atomized spherical aluminum particles having an average diameter from about 2.0 to about 10 $\mu$m equivalent spherical diameters (ESD) air-atomized aluminum particles having an average diameter of about 1.5 to about 10 $\mu$m ESD; flake aluminum particles; or mixtures thereof. Particles larger than 10 $\mu$m ESD, or particles smaller than 2 $\mu$m ESD, may be used. Most preferably, the particles have an equivalent spherical diameter less than 5 $\mu$m. Aluminum powders are examples of suitable aluminum particles. Aluminum powders suitable for use in the practice of the present invention are commercially available from Eckart America and Valimet, Inc.

The coating compositions of the present invention may also include one or more leachable corrosion inhibitors. A leachable corrosion inhibitor is one which is capable of inhibiting or passivating the corrosion of the metal substrate by gradual migration through the coating matrix and reaction with the surface of the substrate metal. The leachable corrosion inhibitor is preferably a salt containing environmentally acceptable metals such as metal phosphates, metal metaborates, and combinations thereof, as well as other corrosion inhibitors listed in a publication by Smith entitled "Inorganic Primer Pigments", Federation Series on Coatings Technology and incorporated herein by reference. Suitable leachable corrosion inhibitors for use in the coating compositions of the present invention are zinc phosphate and barium, calcium, zinc borate and zinc aluminum phosphate.

The coating compositions of the invention may also contain other ingredients for coatings such as film-forming agents, wetting agents, or other surfactants (collectively, "surface active agents"), chromatic pigments, and other conventional additives. Other additives may include, for example, refractory compounds such as silica, zirconia, alumina, silicon carbide, aluminum silicate, boron nitride, and metal powders that may be added for higher heat resistance. Dry lubricants, such as graphite or tungsten disulfide, may also be added to the coating compositions.

The preferred mole ratios of phosphate ions to chromium (III) ion are unchanged in those systems in which a pigment is added.

A surfactant solution may be added to the coating compositions of the present invention, particularly in topcoat applications, to promote sprayability and film-forming properties. For example, if a surfactant is utilized, a volumetric equivalent of 10% of the bonding composition is added containing a surfactant solution. The surfactant may be any commercially-available ionic or non-ionic surfactant. A preferred surfactant is Triton X-100 from Union Carbide.

The bonding compositions and coating compositions of the invention are heat curable, in that temperatures greater than about 150° C. are required to cure the compositions to form coatings.

The preparation of the bonding compositions and coating compositions of the present invention follow conventional methods well known in the art. The components of the bonding compositions and coating compositions are added and mixed at room temperature under low-shear mixing conditions.

The coating compositions of the invention containing metallic aluminum are applied to ferrous metal alloy surfaces following conventional application methods. Generally, it is desirable to degrease the part to be coated and to abrade, roughen and blast the surface with abrasive. The coating composition of the invention is then applied by any suitable means. Suitable application means include spraying, brushing, dipping, dip spinning, and the like. The applied coating is then dried.

The coating composition is then cured at about 650° F. (343° C.) for 15 minutes or longer, at higher or lower temperatures if desired, to form a coating. The coating composition is preferably applied in two coats, each about 0.001 inch (25 $\mu$m) in thickness. It may be desired to dry and cure the coating between applied coating steps. Though drying is not essential, a typical dry/cure scheme employs 15 to 30 minutes of exposure to a temperature of about 180° F. (82° C.), followed by curing at 650° F. (343° C.) for 30 to 60 minutes.

The coatings cured at 650° F. (343° C.) are not electrically conductive and therefore can not provide galvanic protection against corrosion of the underlying substrate material. However, the coating may be made electrically conductive by bead peening or glass bead burnishing. The coating may also be made electrically conductive by using abrasive media at low pressure (or mechanically cold working it in other ways to produce a conductive sacrificial coating), or by heating as specified in MIL-C-81751B specification (incorporated herein by reference). In this manner the coatings can, by mechanical or thermal processes, be made electrically conductive and thereby produce galvanic as well as barrier protection of the underlying ferrous alloy substrate.

Desirably, after the second coating is applied, dried, cured and processed to make it electrically conductive, the surface of the coating is sealed with the bonding composition to further increase the oxidation and corrosion protection provided by the coating, and to decrease the rate of consumption of aluminum in the coating during service. The bonding composition can be, but need not be, a bonding composition of the invention. The topcoats, or seal coats, are dried and cured at the same time and temperature as the above described basecoat coatings containing metallic aluminum.

It is contemplated that all metallic substrates are candidates for receiving protective coatings of the present invention. The coating compositions of the present invention can be applied to any ferrous metal alloy article including cast iron, mild steel, low alloy steels, 300 and 400 series stainless steels, nickel-based alloys and titanium alloys. The coating compositions are designed particularly for turbine compressors. Turbine compressor airfoils are usually manufactured from 400 series stainless steel having 12% chromium. The coating compositions can be applied to blades, disks, spacers, vanes, hubs, cases, and other steel components. While ferrous alloy substrates are the preferred metal substrate for coated articles of manufacture, it is believed that any solid substrate is, in fact, a suitable candidate for the coatings of the present invention, limited only by the ability of the solid substrate to survive the curing process.

The practice of the invention is illustrated by the non-limiting examples that follow. In the following examples, and unless otherwise specified, coating compositions are spray-applied to metal substrates. All curing processes follow the procedure: drying at 175° F. for 15 minutes, then curing for 30 if minutes at 650° F. Where specified, average particle sizes for aluminum powders are measured using the Fisher Sub Sieve Sizer ("FSSS", ASTM B330). The average particle diameter determined by the FSSS is actually a statistical average rather than a true particle size. Unless designated otherwise, the aluminum powder utilized in the coating compositions of the Examples is Eckart 1-201 aluminum powder from Eckart America, Inc.

Several of the formulated coatings in the following examples were evaluated for the completeness of cure and their effectiveness as a barrier or sealant. As conducted for the examples herein, a hot water resistance test required application of the basecoat coating compositions to a steel panel that is then cured as set forth above to form a coating. The coated panel was then placed in hot deionized water for 10 minutes. The deionized water was heated to boiling prior to the introduction of the coated panel. The concentration of leached phosphate ion in the water bath was measured with a Hach PO-19 test kit. The most protective, most impermeable, and best sealing coatings are those having the lowest measured concentration of leached phosphate ion. Measured concentration values of leached phosphate ion are normalized on a per-mil-coating basis to account for variations in coating thickness.

Coatings with poor hot water resistance (a phosphate concentration greater than about 30 mg/L/mil) exhibited a reduced corrosion resistance, as evidenced by formation of concentrated corrosion cells. These coatings are unacceptable as protective coatings or as topcoat sealer coatings. Coatings with desirable hot water resistance (phosphate concentration less than 10 mg/L/mil) were more completely cured, and resultantly, exhibited a more uniform corrosion resistance behavior evidenced by a reduced amount of corrosion product. Coatings yielding a leached phosphate concentration between 10 mg/L/mil and 30 mg/L/mil are less desirable than those passing the test as coating compositions. Coatings that are less completely cured are basecoats that are not compatible with many film-forming topcoats because the material that leaches from the coating disrupts the topcoat film.

The presence of chromium(III) ions in the bonding compositions within the preferred mole ratios of phosphate ions to chromium(III) ions have been found to promote the formation of an exceptionally well-sealed, protective barrier coating as evaluated and quantitatively measured by a hot water resistance test (as described in Table I). The bonding compositions of the present invention exhibit phosphate ion leaching of less than 10 mg/L/mil and generally have phosphate ion leaching of essentially zero mg/L/mil, making the coatings of the present invention very effective, water-impermeable sealants.

Several other tests were conducted to assess the performance of applied coating compositions of the present invention. Table I summarizes the tests and the passing criteria.

TABLE I

Performance Tests

| Test Description | Requirement |
| --- | --- |
| 500 hrs. salt spray per ASTM B117 (scribed with an "X") | no evidence of attack of the base metal |
| Bend adhesion, 90° around a 0.25 inch mandrel | no cracking or separation from the base metal greater than ⅛ inch from edge |
| Hot Water Resistance (insolubility) | <10 mg/L/mil $PO_4$ in water after immersion of coated specimen for 10 min. in hot DI water. $PO_4$ test using HACH PO19 test kit |
| Abrasion Resistance, Falling sand per ASTM D968 | >100 L/mil |
| Oxidation Resistance, 100 hrs at 1000° F. | <1 mg/cm$^2$ weight change |
| Hydraulic Fluid Resistance, 24 hrs in Skydrol at 300° F. | no blistering or softening of coating |

EXAMPLE 1

A phosphoric acid/Cr(VI)bonding solution, designated bonding solution "A", was prepared by mixing the following (in the order listed):

| | |
| --- | --- |
| 1490.5 g | deionized water |
| 136.8 g | magnesium oxide |
| 113.0 g | chromic acid flake |
| 722.5 g | phosphoric acid, 85% |
| 28.2 g | aluminum hydroxide |
| 8.8 g | hypophosphorous acid, 50% |

Bonding solution A had a measured pH of 2.2 and a specific gravity of 1.29 g/ml. Bonding solution A had a solids content of about 30 wt %.

An unpigmented phosphoric acid/chromium (III) bonding solution containing no Cr(VI) was prepared by incrementally adding 277 ml of 35% hydrogen peroxide solution to a 1900 ml aliquot of bonding solution A. The resulting dark green suspension (bonding solution A'), having a pH of 3.9, was allowed to sit for 12 hours to permit sufficient time for the reduction of Cr(VI) to Cr(III).

At the expiration of 12 hours, bonding solution A' contained no Cr(VI) ions in solution as determined by a calorimetric Hach Test (having a lower detection limit of 0.1 mg/L for Cr(VI)) yielding negative results.

The pH of bonding solution A' was adjusted to 2.5 by addition of 120 ml of 85% phosphoric acid. A surfactant solution containing 0.06 wt % Triton X-100 (non-ionic surfactant) was then added to bonding solution A'. The quantity of surfactant solution added was about a 10% volumetric equivalent of the bonding solution. An additional 10% volumetric equivalent of cellosolve acetate was added to bonding solution A'.

Bonding solution A' was spray-applied to pre-treated panels of mild carbon 1010 steel and 410 stainless steel. The steel panels had been pre-treated with two coats of a Cr-free basecoat composition of the prior art. The Cr-free basecoat was prepared by mixing the following:

| | |
|---|---|
| 200 ml | bonding solution formulated from: |
| | 800 g deionized water |
| | 388 g 85% phosphoric acid |
| | 17.5 g zinc oxide |
| | 10.3 g ferric phosphate |
| | 120 g magnesium carbonate |
| | 31 g boric acid |
| 50 ml | deionized water |
| 8.0 g | zinc aluminum phosphate |
| 120 g | aluminum powder |
| | (4.5 μm average particle size) |

The basecoat composition was sprayed onto the steel panels, dried at about 175° F. for 15 minutes and cured at 650° F. for 30 minutes. A second coat of the basecoat composition was then applied and similarly dried and cured. The cured coating was grit burnished.

Bonding solution A' was sprayed, as a topcoat, onto the pre-treated steel panels and dried, then cured, as described for the basecoat formation. For purposes of comparison, identically pre-treated steel panels were coated with a Cr(VI) topcoat solution (bonding solution A).

Bonding solution A' was observed to have a sprayability comparable to, or better than, bonding solution A.

A 410 stainless steel panel having a Cr(III)-based topcoat (bonding solution A') applied thereon had a measured surface finish of Ra=35 microinches at 0.030 inches cut-off. A 410 stainless steel panel having a Cr(VI)-based topcoat had a measured surface finish of Ra=38 microinches at 0.030 inches cut-off. Thus, Cr(III) topcoats are as smooth as, or somewhat smoother than, Cr(VI) topcoats.

Steel panels coated with bonding solutions A and A' were subjected to crosshatch adhesion tests (ASTM D3359, method B). All panels showed excellent coating adhesion, whether coated with Cr(III) or Cr(VI) topcoats.

Steel panels coated with bonding solutions A and A' were subjected to a 24 hour Machu Test. The Machu Test is an aggressive, accelerated corrosion resistance test. Test samples are partially immersed in an aqueous sodium chloride/hydrogen peroxide solution for 24 hours. All steel panels showed no signs of red rust at the test's conclusion.

Therefore, steel panels having a Cr(III)-based topcoat performed as well as panels having a Cr(VI)-based topcoat.

EXAMPLE 2

A pigmented phosphoric acid/Cr(VI) topcoat bonding solution, designated as topcoat bonding solution X, was prepared by mixing the following (in the order listed):

| | |
|---|---|
| 500 g | bonding solution A (Example 1) |
| 35.8 g | deionized water |
| 0.056 g | FC-95 Fluorad surfactant |
| 7.8 g | fumed silica, Cab-O-Sii M-5 |
| 3.9 g | chromium (III) oxide |
| 7.9 g | magnesium ferrite pigment, Mapico Tan 20A |

A phosphoric acid/chromium (III) topcoat bonding solution, designated as topcoat bonding solution "X'", was prepared by mixing the following (in the order listed):

| | |
|---|---|
| 500 g | Cr (III) bonding solution A' (Example 1), pH = 2.0 |
| 35.8 g | deionized water |
| 0.056 g | FC-95 Furad surfactant |
| 7.8 g | fumed silica (Cab-O-Sil-5) |
| 3.9 g | chromium (III) oxide ($Cr_2O_3$) |
| 7.8 g | magnesium ferrite pigment, Mapico Tan 20A |

The resulting pigmented Cr(III) topcoat bonding solution had a measured pH of 2.2 and a specific gravity of 1.15 g/ml. Bonding solution X' had a 31.4% solids content.

A volume of cellosolve acetate at about a 10% volumetric equivalent of solution X' was added to bonding solution X'. The resulting solution was sprayed as a topcoat onto mild 1010 steel and 410 stainless steel panels. The panels were pretreated with two coats of either of two basecoat compositions of the prior art: the chrome-free basecoat of Example 1 or an aluminum powder-containing Cr(VI) basecoat formulated by mixing the following (see Example 7, U.S. Pat. No. 3,248,251): 92 g $CrO_3$, 323 g $H_3PO_4$, 72 g MgO, and the balance deionized water to 1000 ml. Topcoat bonding solution X was similarly modified with cellosolve acetate and sprayed as a topcoat onto the pretreated steel panels. All steel panels were dried and cured as described in Example 1.

When applied as a topcoat on the pre-treated substrates, the pigmented Cr(III) bonding solution was observed to have sprayability characteristics similar to those of pigmented Cr(VI) topcoat formulations.

A 410 stainless steel panel, having a Cr(III) topcoat and pre-treated with a chrome-free basecoat, had a measured surface finish value of Ra=32 microinches at 0.030 inches cut-off. A 410 panel having a Cr(VI) topcoat (and a chrome-free basecoat) had a measured surface finish value of Ra=37 microinches at 0.030 inches cut-off. Similar results, showing that pigmented Cr(III) topcoats are as smooth, or smoother, than pigmented Cr(VI) topcoats, were obtained for the 1010 mild carbon steel panels having the same chrome-free basecoat. The pigmented Cr(III)-topcoated panels had a surface finish value Ra in the range of 32–36 microinches at 0.030 inches cut-off, while the pigmented Cr(VI)-topcoated controls had substantially rougher surfaces with a surface value Ra=51 microinches at 0.030 inches cut-off.

The 410 steel panels coated with Cr(III) and Cr(VI) topcoats were subjected to crosshatch adhesion testing as in Example 1. All panels showed excellent coating adhesion, whether coated with Cr(III) or Cr(VI) topcoats.

Panels (1010 mild carbon steel) were exposed to a 5% salt spray solution (per ASTM B117) for over 500 hours. Both the pigmented Cr(III)-topcoated panels and the pigmented Cr(VI)-topcoated panels (all having a chrome-free basecoat) showed only slight discoloration, with no indication of red rust on any of the test panels. No red rust was observed on the panels pre-treated with either the chrome-free basecoat or the Cr(VI) basecoat.

EXAMPLE 3

A phosphoric acid/Cr(III) bonding solution, designated as bonding solution B, was prepared by mixing the following (in the order listed):

| | |
|---|---|
| 80 ml | deionized water |
| 36.4 ml | phosphoric acid, 85% |
| 9.0 g | chromium (III) borate |
| 2.8 g | zinc oxide |
| 17.2 g | aluminum hydroxide, dried gel |
| 80 ml | deionized water |

The resulting dark green bonding solution had a pH of 2.1 and specific gravity of 1.19 g/ml.

A coating composition of the present invention was prepared by employing bonding solution B:

| | |
|---|---|
| 100 ml | bonding solution B |
| 80 g | aluminum metal powder, air atomized, 4.5 μm average particle size |

No reaction was observed between the metallic aluminum and the bonding solution after 7 hours. Thus, a stable particulate aluminum basecoat composition free of Cr(VI) is produced.

EXAMPLE 4

A phosphoric acid/Cr(III) bonding solution, designated bonding solution "C", was prepared by mixing the following (in the order listed):

| | |
|---|---|
| 380 ml | deionized water |
| 150 ml | phosphoric acid, 85% |
| 44 g | chromic acid flake |
| 40 g | aluminum hydroxide, dried gel |
| 110 ml | hydrogen peroxide, 35% |

The resulting solution had a measured pH of 1.2 and contained 28.9 wt % solids. Bonding solution C had a negative Hach Test result for Cr(VI) ion (as described in Example 1).

A pigmented Cr(III) bonding solution, designated C', was prepared by adding the following (in the order shown):

| | |
|---|---|
| 100 ml | bonding solution C |
| 25 ml | deionized water |
| 1.8 g | hydrated magnesium aluminum silicate |
| 55 g | iron cobalt chromite spinel, black pigment |

Bonding solution C' was sprayed onto an automotive manifold (tailpipe) fabricated from a mild steel alloy. After drying at 175° F. for 15 minutes and curing at 650° F. for 30 minutes, a test coupon from the coated article was subjected to a crosshatch adhesion test (as in Example 1). The test coupon showed only the slightest removal of the cured coating (4B rating).

The coated article itself was subjected to thermal treatment at 850° F. for 24 hours. After the heat exposure, the coated article was visually inspected and showed no loss, blistering or peeling of the coating. A coating of the present invention exhibits acceptable heat resistance.

EXAMPLE 5

A phosphoric acid/Cr(III) bonding solution, designated as bonding solution D, was prepared by mixing the following (in the order listed):

| | |
|---|---|
| 40 ml | deionized water |
| 31.3 g | 85% phosphoric acid |
| 4.2 g | chromium (III) hydroxide |
| 3.9 g | zinc borate hydrate (BOROGARD ZB from U.S. Borax) |
| 12 g | aluminum hydroxide, dried gel |
| 60 ml | deionized water |

The resulting bonding solution had a measured pH of 2.2 and a specific gravity of 1.17 g/ml. A coating formulation useful as a phosphate-based, aluminum-filled basecoat, designated as basecoat E, was prepared by mixing the following:

| | |
|---|---|
| 20 ml | bonding solution D |
| 16 g | aluminum metal powder, air atomized, 4.5 μm average particle size |

Basecoat E, following preparation, showed no sign of reactivity (i.e., no exotherm or gas evolution) over a 4–6 hour period.

Basecoat E was spray-applied, as two coats, onto 1010 mild steel substrate, dried at 175° F. for 15 minutes and cured at 650° F. for 30 minutes to produce an aluminum-filled ceramic coating on the steel substrate. The cured basecoat on the steel substrate was immersed in hot water (at 195–200 F) and tested for the presence of leached phosphate ion (Hach Test). A level of 4.7 mg/L phosphate ion per 1 mil of coating thickness was measured. Phosphate ion concentrations of less than about 10 mg/L/mil coating thickness are considered low and constitute acceptable test performance.

For purposes of comparison, a 1010 mild steel panel was coated with a basecoat of the prior art not containing Cr(III) in the formulation. The prior art basecoat was prepared by mixing the following:

| | |
|---|---|
| 200 ml | bonding solution prepared from 800 g deionized water 388 g phosphoric acid, 85% 17.5 g zinc oxide 10.3 g terric phosphate 120 g magnesium carbonate 31 g boric acid |
| 50 ml | deionized water |
| 8 g | zinc aluminum phosphate (Heucophos ZPA) |
| 120 g | aluminum powder, air atomized, 4.5 μm average particle size |

A cured coating as prepared above showed phosphate ion leaching in the range of 17–22 mg/L/mil as measured by the Hach Test.

EXAMPLE 6

A phosphoric acid/Cr(III) bonding solution, designated as bonding solution "F", was prepared by mixing the following:

| | |
|---|---|
| 150 ml | deionized water |
| 70 ml | 85% phosphoric acid |
| 15 g | chromium (III) carbonate |
| 3.0 g | zinc oxide |
| 30.0 g | aluminum hydroxide, dried gel |

Bonding solution F had a measured pH of about 2.

Test panels of 1010 mild steel and 410 stainless steel had prior art Cr(III)-free basecoats applied thereon as set forth in Example 5. Each panel received two coats of the basecoat material. After curing the test panels (as set forth in Example 5), the surface smoothness of the cured coating was found to be in the range of 50–55 microinches at a 0.030 inch cut-off for all test panels.

Two coats of bonding solution F were then spray-applied to each basecoated test panel. After curing the bonding solution F topcoats (as set forth in Example 5), the surface smoothness was again measured. The surface smoothness of the coated surface was measured to be in the range of 37–39 microinches at a 0.030 inch cut-off. Thus, the Cr(III)-containing topcoat produced a smoother surface finish than that shown by the prior art basecoat alone.

The Cr(III)-topcoated steel test panels were subjected to a controlled environment at 100° F./100% humidity for over 450 hours. The Cr(III)-topcoated test panels exhibited little or no discoloration and no measured increase in surface profile.

Uncoated, bare 1010 mild steel panels showed massive red rust formation within about 72 hours of humidity test exposure.

It was also noted during this test that the test panels coated with the Cr(III)-containing topcoat sealer showed a marked capability to repel water. It was observed that water beaded on, and readily flowed off, the coating. A similar characteristic water repellancy was not observed for test panels which were coated with Cr(VI)-containing basecoats and topcoat sealers (as described in Example 2).

The test panels (having a basecoat and Cr(III)-containing topcoat) were subjected to a corrosion test (ASTM B117, 5% salt spray). After 168 hours of salt spray exposure, the test panels showed no red rust formation and little or no "white" corrosion on either scribed or unscribed panels. Uncoated, bare metal test panels (1010 steel) showed massive formation of red rust within 24 hours. The test performance of the Cr(III) coated panels is comparable to that shown by panels having Cr(VI)-containing topcoats.

EXAMPLE 7

A pigmented phosphoric acid/Cr(III) bonding solution, designated bonding solution G, was prepared by mixing the following:

| | |
|---|---|
| 58.3 g | bonding solution F (Example 6) |
| 34.2 ml | deionized water |
| 0.01 g | fluorocarbon surfactant (3M FC-95) |
| 1.0 g | fumed silica (Cab-O-Sil M-5) |
| 6.6 g | chromium (III) oxide |
| 0.03 g | nonionic surfactant (Triton X-100) |

Bonding solution G had a pH of about 2.

Bonding solution G was spray-applied to 1010 steel panels pre-treated with a Cr(III)-free basecoat as described in Example 5. The test panels were then cured as in Example 6. The resultant cured panels (bearing a dark green appearance due to the chromium (III) oxide pigment) had a measured surface profile in the range of about 47–50 microinches at a 0.030 inch cut-off.

The cured test panels were subjected to both humidity and salt spray testing as described in Example 6. The test panels topcoated with Cr(III)-containing bonding solution G showed little or no discoloration after being exposed to an environment at 100° F./100% humidity for over 450 hours. The coated test panels also showed no formation of red rust and very slight or no white corrosion on scribed or unscribed panels after salt spray testing (ASTM B117) for over 168 hours. Thus, viable pigmented Cr(III)-containing bonding solutions (topcoat sealers), having no Cr(VI) ions in the formulation, have been produced.

EXAMPLE 8

A phosphoric acid/Cr(III) bonding solution, designated bonding solution H, was prepared by chemical reduction of Cr(VI) to Cr(III). Bonding solution H was prepared by mixing the following:

| | |
|---|---|
| 596 g | deionized water |
| 45 g | chromic acid |
| 200 g | 85% phosphoric acid |
| 100 g | 50% hypophosphorous acid |

Care was taken to prepare bonding solution H because of the exothermic behavior of the system upon addition of the hypophosphorous acid. To ensure complete conversion of Cr(VI) to Cr(III), the solution was heated to near boiling for about 2 hours. A Hach calorimetric test showed no Cr(VI) present in the resulting solution. Bonding solution H, after Cr(VI) reduction, had a measured pH of 0.50.

Bonding solution H served as a platform for developing topcoat formulations that enable the formation of coatings having enhanced glassiness and film-forming properties. The preparation of two separate phosphoric acid/Cr(III) bonding solutions, designated binder I and binder J, are prepared by mixing the following:

| Binder I | Binder J |
|---|---|
| 100 g bonding solution H | 100 g bonding solution H |
| 6.5 g aluminum hydroxide, dried gel | 6 g magnesium carbonate |

Binder I had a pH of 1.8. Binder I was placed in an aluminum dish, dried, and then cured at 650° F. for 30 minutes. The resultant coating was light green and semi-glassy in appearance. Binder J had a pH of 1.8, which was applied and cured (as binder I) to produce a glassy, porcelain enamel-like coating.

By slightly increasing the pH of binders such as binders I or J, a bonding solution can be more readily utilized as an aluminum powder-filled basecoat. To illustrate: a phosphoric acid/Cr(III) bonding solution, designated as binder K, was prepared by mixing the following:

| | |
|---|---|
| 100 g | bonding solution H |
| 6 g | zinc borate hydrate (BOROGARD ZB, US Borax) |

| | |
|---|---|
| 3 g | aluminum hydroxide, dried gel |
| 4 g | magnesium carbonate |

Binder K had a pH of 2.4

A basecoat composition, designated as K', was prepared by mixing the following:

| | |
|---|---|
| 20 ml | binder K |
| 13 g | aluminum metal powder, air atomized, 4.5 μm average particle size |

No chemical reaction was observed between the binder K and the metallic aluminum in the five hour period following the introduction of the metallic aluminum. The observed stability indicates the utility of this Cr(III) binder as a good film-forming, aluminum-filled ceramic basecoat which will provide sacrificial corrosion protection to various metal substrates.

EXAMPLE 9

A phosphoric acid/Cr(III) bonding solution, designated bonding solution L, was prepared by mixing the following:

| | |
|---|---|
| 80.5 g | deionized water |
| 37.3 g | 85% phosphoric acid |
| 10.2 g | chromium (III) borate |
| 10.9 g | magnesium carbonate |

Bonding solution L was determined to have 26.4 wt % solids content and a pH of about 2. A basecoat composition, designated L', was prepared by mixing the following:

| | |
|---|---|
| 20 ml | bonding solution L |
| 16 g | aluminum metal powder, air atomized, 4.5 μm average particle size |

Basecoat composition L' exhibited a slight, slow reactivity with the aluminum powder. The reactivity resulted in a qualitative increase in the viscosity of L' from water-like to the consistency of latex paint. The pH of L' increased to about 3.5. These changes in physical property took place over a period of 60 or more days. The basecoat composition L' was still brushable after 60 days and can be applied as a protective coating to metal substrates.

EXAMPLE 10

A phosphoric acid/Cr(III) bonding solution designated bonding solution M, was prepared by mixing the following:

| | |
|---|---|
| 40 ml | deionized water |
| 18.4 ml | 85% phosphoric acid |
| 4.5 g | chromium (III) borate |
| 1.4 g | zinc oxide |

| | |
|---|---|
| 8.6 g | aluminum hydroxide, dried gel |
| 40 ml | deionized water |

Bonding solution M had a measured pH of 2.1 and a specific gravity of 1.19 g/ml. A basecoat composition, designated M', was prepared by mixing the following:

| | |
|---|---|
| 10 ml | bonding solution M |
| 8 g | aluminum metal powder (air atomized, 4.5 μm avg. particle size) |

Basecoat composition M' showed no sign of reactivity with aluminum powder in the 8 hour period following the preparation of the basecoat composition. Basecoat composition M' remained quite non-viscous (fluid-like), exhibiting only a moderate increase in viscosity, measured qualitatively, over a period of 18 hours.

EXAMPLE 11

A phosphoric acid/Cr(III) bonding solution, designated bonding solution N, was prepared by mixing following:

| | |
|---|---|
| 100 ml | deionized water |
| 28 ml | 85% phosphoric acid |
| 10 g | chromium (III) carbonate |
| 2 g | zinc oxide |
| 8 g | aluminum hydroxide |

Bonding solution N had a pH of 2.

Bonding solution N was spray-applied and cured as a topcoat (two applied coats) to panels of 1010 mild steel pre-treated with a chromium-free basecoat application as described in Example 5. The Cr(III)-containing topcoat had good sprayability on this type of chromium-free basecoat.

The resulting coated 1010 steel test panels were subjected to a 5% salt spray exposure test (ASTM B117). After 168 hours of exposure, the unscribed coated test panels showed no sign of corrosion, no evidence of red rust formation or white corrosion. The test result affirms the excellent barrier/sealing properties of the Cr(III)-containing chromium topcoat. An identically coated (but scribed) 1010 test panel showed no sign of corrosion, pitting, degradation, or discoloration in the unscribed area after 168 hours of exposure; in the scribed area, some white corrosion was noted. The Cr(III) topcoat/chromium-free basecoat of this example shows ASTM B117 test performance, scribed and unscribed, comparable to that demonstrated by hexavalent chromium-containing coatings of the prior art.

EXAMPLE 12

A pigmented phosphoric acid/Cr(III) bonding composition, designated as coating "O", was prepared by mixing the following (in the order listed):

| | |
|---|---|
| 58.3 g | binder N (Example 11) |
| 34.2 ml | deionized water |
| 0.01 g | fluorocarbon surfactant (3M FC-95) |
| 1.0 g | fumed silica (Cab-O-Sil-5) |

| | |
|---|---|
| 6.6 g | chromium (III) oxide |
| 0.03 g | nonionic surfactant (Triton X-100) |

Coating composition O was spray-applied (one coat) to a titanium 6A1-4V compressor blade (ASM 4967). This substrate is typically used for aerospace power generating applications. The blade was then dried at 175° F. for 15 minutes and then cured at 650° F. for 30 minutes. Two coats of bonding solution N (Example 11) were then additionally spray-applied to the subject blade and dried and cured as described above. The coating contained neither particulate aluminum or any other sacrificially active metallic pigment.

The resultant coated blade had a measured surface profile of less than 20 microinches at a 0.030 inch cut-off. This is indicative of an aerodynamically smooth surface.

The coated blade passed a series of performance tests, as described in Table I, demonstrating that the cured coatings of this invention adhere well to the substrate (as tested per ASTM D3359, method B) and provide the titanium substrate with abrasion resistance, corrosion resistance, and resistance to thermo-oxidative degradation at temperatures up to about 1000° F.

EXAMPLE 13

A pigmented phosphoric acid/Cr(III) bonding composition, designated as coating "P", was prepared by mixing the following (in the order listed):

| | |
|---|---|
| 100 ml | binder N (Example 11) |
| 100 g | aluminum oxide powder |

Coating composition P was spray-applied (one coat) to a titanium 6Al-4V compressor blade (ASM 4967), dried, then cured as described in Example 12. One coat of coating composition O (Example 12) was spray-applied to the coated blade, then dried and cured under the same conditions (Example 12). Two coats of binder N (Example 11) were thereafter spray-applied to the coated blade, dried, and cured as described above after each coat. The resulting titanium compressor blade, coated with hexavalent chromium-free coatings of the invention, was found to have good performance as determined by adhesion, corrosion resistance, abrasion resistance, and thermo-oxidative resistance up to 1000° F. testing, as per the tests described in Example 12.

EXAMPLE 14

A phosphoric acid/Cr(III) bonding composition, designated as bonding solution "Q", was prepared by mixing the following:

| | |
|---|---|
| 120 g | deionized water |
| 56 g | 85% phosphoric acid |
| 48 g | chromium (III) carbonate |

The chromium (III) carbonate was added incrementally to the aqueous acid. As the chromium (III) compound dissolved to form a green solution, the pH of the solution increased as summarized in Table II:

TABLE II pH values

| total amount chromium (III) carbonate added (g) | pH of bonding solution |
|---|---|
| 0 | <0 |
| 5 | 0.2 |
| 25 | 0.7 |
| 33 | 1.0 |
| 39 | 1.2 |
| 48 | 1.5 |

Bonding solution Q had a pH of 1.5. Bonding solution Q was sprayed as a topcoat onto one of two 1010 mild steel panels which had both been initially coated with a Cr-free basecoat as described in Example 1. The panel with the applied topcoat (panel Y) was dried at 175° F. for 15 minutes and cured at 650° F. for 30 minutes.

Both test panels were subjected to the water immersion phosphate leaching test. The panel receiving the bonding composition Q topcoat (panel Y) was found to have a normalized phosphate ion leaching of 0.0 mg/L/mil. The comparison test panel receiving no topcoat (panel Z) was found to have a normalized phosphate ion leaching of 17 mg/L/mil.

Another 1010 mild steel test panel was prepared as panel Z above (panel Z'). The surface profile of panel Z was measured by profilometer as Ra=55 microinches at a 0.030 in cutoff. Bonding solution Q was then spray-applied as a topcoat to panel Z', then thermally dried and cured as described above. The surface profile of the resulting coated panel was found to be substantially lower, at Ra=26 microinches at a 0.030 inch cutoff. Bonding solution Q demonstrated its surface smoothing utility.

Bonding solution Q consisted only of a chromium (III) compound dissolved in aqueous phosphoric acid. The chromium (III) compound of this example serves as a source of soluble, trivalent chromium and the compound also effects an increase in the pH of the bonding solution.

EXAMPLE 15

A phosphoric acid/Cr(III) bonding solution, designated bonding solution "R", was prepared by mixing the following, in the order listed:

| | |
|---|---|
| 500 ml | deionized water |
| 150 ml | 85% phosphoric acid |
| 50 g | chromic acid flake |
| 162.5 ml | 35% hydrogen peroxide |
| 50.7 g | aluminum hydroxide, dried gel |

Bonding solution R had a measured pH of 1.8.

The addition of hydrogen peroxide was carried out in a controlled, incremental, titration-like manner. During the addition of the hydrogen peroxide, the bonding solution was periodically tested for the presence of hexavalent chromium, using the Hach calorimetric test. The addition of hydrogen peroxide was stopped when the Hach test showed the complete absence of hexavalent chromium in solution "R". Aluminum hydroxide was then added incrementally (to control foaming), to adjust the pH to a desired value of 1.8.

Bonding solution R was spray-applied to panels of 1010 mild steel pre-treated with a chromium-free basecoat of the prior art as described in Example 5. The panels were dried for 15 minutes at 175° F. and cured at 650° F. for 30 minutes. Similar 1010 mild steel panels were coated (then cured) only with the chromium-free basecoat of the prior art (Example 5). All coated panels were immersed in hot water to determine the level of phosphate leaching. The topcoat/basecoated panel was determined to have a leached phosphate concentration in the range of 0–1 mg/L/mil. The panel receiving only a basecoat was determined to leach phosphate to a concentration of 20 mg/L/mil. The results illustrate the sealing effectiveness of the cured chromium (III)-based bonding solution R.

A pigmented bonding solution, designated bonding solution "S", was prepared by mixing the following:

| | |
|---|---|
| 180 g | bonding solution "R" |
| 0.05 g | EC-95 Furad surfactant |
| 2.0 g | chromium (III) oxide ($Cr_2O_3$) |
| 4.0 g | magnesium ferrite pigment, Mapico Tan 20A |

Bonding solution "S" was sprayed as two coats onto a titanium 6A1-4V compressor blade (ASM 4967). Each coat was separately dried at 175° F. for 15 minutes and cured at 650° F. for 30 minutes. A compressor blade of this constitution is commonly used for aerospace power generating applications.

Bonding solution S produced cured coatings having surface profiles similar to or lower (Ra=20–25 microinches at 0.030 inch cutoff) than the related hexavalent chromium coatings in bonding solution X of Example 2(Ra=25–35 microinches at 0.030 inch cutoff).

EXAMPLE 16

A series of bonding compositions was prepared having varying molar ratios of Cr(III) ion to phosphate ion ($PO_4^{-3}$), in order to evaluate the sealing capabilities of cured coatings formed from the prepared compositions. Bonding compositions of the present invention were prepared by mixing deionized water, 85% $H_3PO_4$, Cr(III) carbonate, and aluminum hydroxide in the amounts shown in Table III. Aluminum hydroxide was added in amounts sufficient to bring each bonding composition to a pH within the range of 1.5 to 2.0.

Figure 1:
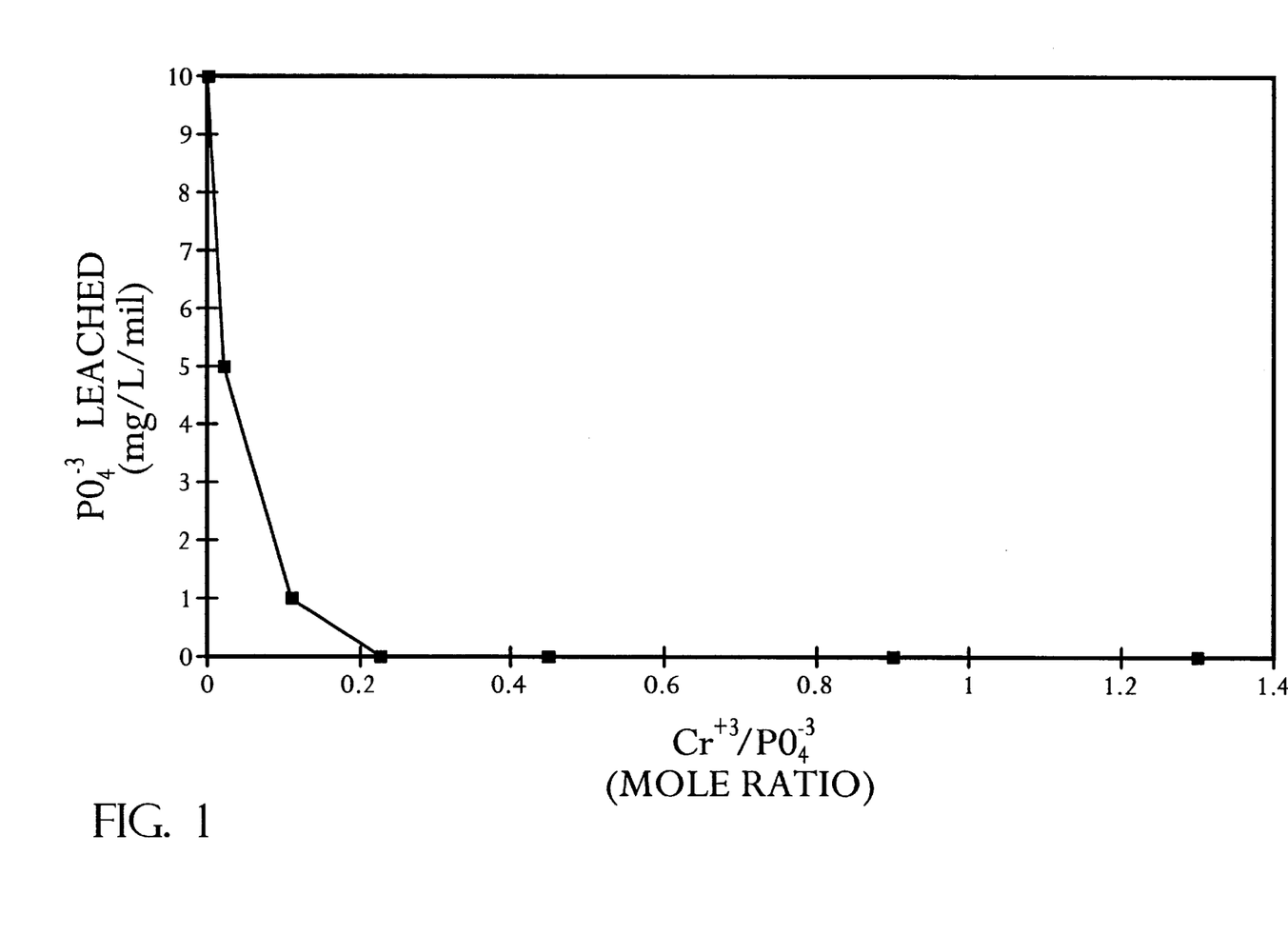
FIG. 1 is a plot of leached phosphate ion ($PO_4^{-3}$, mg/L/ mil) versus the molar ratio of Cr(III) ion to phosphate ions.

FIG. 1 is a plot showing the effect of trivalent chromium concentration on the extent of phosphate ion leaching. As shown in FIG. 1, the bonding composition containing no Cr(III) ion exhibited the poorest film-forming, barrier performance as evidenced by the comparatively high phosphate leaching value. In addition to the cured bonding compositions shown in Table III, the cured chromium-free bonding composition described in Example 1 was also tested for phosphate leaching, having a value of 17 mg/L/mil.

As also shown in FIG. 1, as the amount of Cr(III) ion in the composition increases (at constant phosphate ion concentration and constant pH), the extent of phosphate ion leaching in the cured coating is found to decrease exponentially to zero mg/L/mil. The bonding compositions of the invention, having Cr(III) ions, enable coatings having excellent sealing, barrier protection properties.

It should also be noted that the highest concentration of Cr(III) represented in FIG. 1, a ratio of 1.3:1, is very near the solubility limit for Cr(III) ions in this aqueous, acidic solution. Those skilled in the art will realize that the specific amount of Cr(III) needed to reach saturation will depend, at least to some extent, on several factors, including: solution temperature, solution pH, the presence of other ions or compounds in the solution, the acidity/basicity of the specific chromium compound(s) used to prepare the formulation, and the analytical purity of the specific chromium compound.

In terms of the maximum Cr(III) concentration which can be contained in the bonding solutions of the present invention, effective bonding solutions can be prepared which contain trivalent chromium, both in solution and in an insoluble form. With respect to chromium(III)/phosphate mole ratios which exceed the solubility limit for chromium (III) in a specific bonding composition, any additional, insoluble chromium(III) compound(s) could function, for example, as a colorant/dye within the cured coating.

It is further understood that the present invention is not limited to the particular embodiments shown and described herein, but that various changes and modifications may be made without departing from the scope and spirit of the invention.

What is claimed is:

1. A heat curable coating composition comprising metallic aluminum particles dispersed in a heat curable bonding composition comprising:

TABLE III

Phosphate Leaching.

| # | water (g) | 85% $H_3PO_4$ (g) | Cr(III) carbonate (g) | Aluminum hydroxide (g) | Cr(III):$PO_4$ mole ratio | Phosphate leaching (mg/L/mil) | Good Film; Y/N |
|---|---|---|---|---|---|---|---|
| 1 | 120 | 56 | 68 | 0 | 1.3 | 0 | Y |
| 2 | 120 | 56 | 48 | 0 | 0.9 | 0 | Y |
| 3 | 120 | 56 | 24 | 9 | 0.45 | 0 | Y |
| 4 | 120 | 56 | 12 | 12 | 0.23 | 0 | Y |
| 5 | 120 | 56 | 6 | 14 | 0.11 | 1 | Y |
| 6 | 120 | 56 | 1 | 17 | 0.02 | 5 | marg |
| 7 | 120 | 56 | 0 | 17 | 0.0 | 10 | N |

The bonding compositions of the comparison were applied to 1010 mild steel panels which had been initially coated and cured with two coats of the chromium-free basecoat described in Example 1. The test panels were then dried and cured. The concentrations of leached phosphate were measured with the hot water resistance test (Hach PO-19 test method). The bonding compositions were also qualitatively evaluated for film-forming effectiveness by drying and curing the bonding solutions in small aluminum dishes and visually assessing film-forming.

(a) phosphate ions and chromium(III) ions; and
(b) water; wherein the composition has a pH in the range from about 1.0 to about 3.5 and is substantially free of chromate.

2. A coating composition as in claim 1, comprising phosphate ions and chromium(III) ions in a molar ratio in the range from about 0.7 to about 20.

3. A coating composition as in claim 2, comprising phosphate ions and chromium(III) ions in a molar ratio in the range from about 1 to about 10.

4. A coating composition as in claim 1, further comprising at least one secondary cationic species.

5. A coating composition as in claim 1, wherein the bonding composition has a nonvolatile content in the range from about 15 wt % to about 35 wt %.

6. A coating composition as in claim 4, wherein the secondary cationic species of the bonding composition are aluminum ions, magnesium ions or zinc ions.

7. A coating composition as in claim 1, wherein the metallic aluminum particles are selected from the group consisting of flake particles, inert gas atomized spherical powders, air atomized powders, and mixtures thereof.

8. A coating composition as in claim 1, further comprising at least one additive selected from the group consisting of corrosion inhibitors, dry lubricants, surface active agents, chromatic pigments, refractory compounds, and combinations thereof.

9. A coated article comprising a solid substrate having deposited thereon at least one layer of a coating formed by the steps of:
 (a) applying a heat curable coating composition comprising metallic aluminum particles dispersed in a bonding composition comprising
  (1) phosphate ions and chromium(III) ions; and
  (2) water; wherein the composition has a pH in the range from about 1.0 to about 3.5 and is substantially free of chromate.

10. A coated article as in claim 9, comprising phosphate ions and chromium(III) ions in the bonding composition in a molar ratio in the range from about 0.7 to about 20.

11. A coated article as in claim 9, wherein the bonding composition further comprises at least one secondary cationic species.

12. A coated article as in claim 9, wherein the bonding composition has a nonvolatile content in the range from about 15 wt % to about 35 wt %.

13. A coated article as in claim 11, wherein the secondary cationic species are aluminum ions, magnesium ions or zinc ions.

14. A coated article as in claim 9, wherein the metallic aluminum particles are selected from the group consisting of flak e particles, inert gas atomized spherical powders, air atomized powders, or mixtures thereof.

15. A coated article as in claim 9, the coating composition further comprising at least one additive selected from the group consisting of corrosion inhibitors, surface active agents, dry lubricants, chromatic pigments, refractory compounds, and combinations thereof.

16. A method of forming a coating on a solid substrate comprising the steps of:
 (a) applying to the substrate a heat curable coating composition comprising metallic aluminum particles dispersed in a heat curable bonding composition comprising
  (1) phosphate ions and chromium(III) ions; and
  (2) water; wherein the composition has a pH in the range from about 1.0 to about 3.5 and is substantially free of chromate.

17. A method as in claim 16, comprising phosphate ions and chromium(III) ions in the bonding composition in a molar ratio in the range from about 0.7 to about 20.

18. A method as in claim 16, wherein the bonding composition further comprises at least one secondary cationic species.

19. A method as in claim 16, wherein the metallic aluminum particles are selected from the group consisting of flake particles, inert gas atomized spherical powders, air atomized powders, or mixtures thereof.

20. A heat curable bonding composition for a heat curable coating for coating a substrate, the heat curable bonding composition comprising:
 (a) phosphate ions and chromium(III) ions; and
 (b) water; and
 (c) at least one secondary cationic species
wherein the composition has a pH in the range from about 1.0 to about 3.5 and is substantially free of chromate.

21. The bonding composition of claim 20, wherein the secondary cationic species are aluminum ions, magnesium ions or zinc ions.

22. A heat curable bonding composition for a heat curable coating for coating a substrate, the heat curable bonding composition comprising:
 (a) phosphate ions and chromium(III) ions; and
 (b) water; and
wherein the composition has a pH in the range from about 1.0 to about 3.5, is substantially free of chromate, and has a nonvolatile content in the range from about 15 wt % to about 35 wt %.

23. A heat curable topcoat composition comprising:
 (a) phosphate ions and chromium(III) ions;
 (b) water;
 (c) a secondary cationic species; and
 (d) at least one additive selected from the group consisting of wetting agents, film forming agents, corrosion inhibitors, dry lubricants, refractory compounds, chromatic pigments, and combinations thereof;
wherein the composition has a pH in the range from about 1.0 to about 3.5 and is substantially free of chromate.

24. A coated article comprising a solid substrate having deposited thereon at least one layer of a coating formed by the steps of:
 (a) applying to the substrate a heat curable coating composition comprising:
  (1) phosphate ions and chromium(III) ions;
  (2) water; and
  (3) a secondary cationic species, wherein the composition has a pH in the range from about 1.0 to about 3.5 and is substantially free of chromate; and
 (b) heat curing the applied coating composition to produce said coating.

25. A coated article as in claim 24, wherein the secondary cationic species are aluminum ions, magnesium ions or zinc ions.

26. A coated article comprising a solid substrate having deposited thereon at least one layer of a coating formed by the steps of applying to the substrate a heat curable coating composition comprising:
 (1) phosphate ions and chromium(III) ions; and
 (2) water;
wherein the composition has a pH in the range from about 1.0 to about 3.5, is substantially free of chromate; and, has a nonvolatile content in the range from about 15 wt % to about 35 wt %.

27. A method of forming a coating on a solid substrate comprising the steps of:
 (a) applying to the substrate a heat curable coating composition comprising:
  (1) phosphate ions and chromium(i) ions;
  (2) water; and
  (3) a secondary cationic species, wherein the composition has a pH in the range from about 1.0 to about 3.5 and is substantially free of chromate; and
 (b) heat curing the applied coating composition to produce said coating.

28. A heat curable bonding composition for a heat curable coating for coating a substrate, the heat curable bonding composition comprising:

(a) phosphate ions and chromium(III) ions; and
(b) water;

wherein the composition has a pH in the range from about 1.0 to about 3.5, is substantially free of chromate, and has a molar ratio of phosphate ions to chromium(III) ions of at least about 3.5.

29. A heat curable bonding composition for a heat curable coating for coating a substrate, the heat curable bonding composition consisting essentially of:

(a) phosphate ions and chromium(ill) ions; and
(b) water;

wherein the composition has a pH in the range from about 1.0 to about 3.5 and is substantially free of chromate.

30. A heat curable topcoat composition consisting essentially of:

(a) phosphate ions and chromium(III) ions; and
(b) water;
(c) at least one additive selected from the group consisting of wetting agents, film-forming agents, corrosion inhibitors, dry lubricants, refractory compounds, chromatic pigments, and combinations thereof;

wherein the composition has a pH in the range from about 1.0 to about 3.5 and is substantially free of chromate.

* * * * *

UNITED STATES PATENT AND TRADEMARK OFFICE
CERTIFICATE OF CORRECTION

PATENT NO.    : 6,224,657 B1
DATED         : May 1, 2001
INVENTOR(S)   : Meyers et al.

It is certified that error appears in the above-identified patent and that said Letters Patent is hereby corrected as shown below:

Column 23,
Lines 25 and 55, insert after both occurrences of the word "chromate":
-- ; and
(b) heat curing the applied coating composition to produce said coating --

Signed and Sealed this

Seventh Day of January, 2003

JAMES E. ROGAN
*Director of the United States Patent and Trademark Office*